(12) United States Patent
O'Connor

(10) Patent No.: US 7,401,412 B2
(45) Date of Patent: Jul. 22, 2008

(54) HIGH PRECISION GANTRY MACHINE WITH EXPANSION JOINT

(75) Inventor: Brian P. O'Connor, Allison Park, PA (US)

(73) Assignee: Aerotech, Inc., Pittsburgh, PA (US)

( * ) Notice: Subject to any disclaimer, the term of this patent is extended or adjusted under 35 U.S.C. 154(b) by 172 days.

(21) Appl. No.: 11/545,319

(22) Filed: Oct. 10, 2006

(65) Prior Publication Data
US 2008/0083128 A1 Apr. 10, 2008

(51) Int. Cl.
*G01B 5/00* (2006.01)

(52) U.S. Cl. .............................. 33/503; 33/1 M; 384/38

(58) Field of Classification Search ............ 33/503–504, 33/1 M, 567, 567.1, 568, 573, 702, 704; 384/37, 384/38, 57
See application file for complete search history.

(56) References Cited

U.S. PATENT DOCUMENTS 6,019,514 A    2/2000   Feinstein
6,058,618 A    5/2000   Hemmelgarn et al.

*Primary Examiner*—Christopher W. Fulton
*Assistant Examiner*—Tania C Courson
(74) *Attorney, Agent, or Firm*—The Webb Law Firm

(57) ABSTRACT

A Cartesian gantry system having an expansion joint between an X-bridge stage and a Y-translation stage comprises a flexure plate having surfaces secured to the X-bridge stage and the Y-translation stage and bolster flanges extending between the X-bridge stage and Y-translation stage to resist twisting or rotation of the X-bridge.

8 Claims, 5 Drawing Sheets

HIGH PRECISION GANTRY MACHINE WITH EXPANSION JOINT

BACKGROUND OF THE INVENTION

1. Field of the Invention

This invention relates to a high precision gantry machine providing precise movement of a tool in two perpendicular directions over a workpiece.

2. Description of Related Art

Powerful and accurate Cartesian gantry systems are known. They are found in production plants around the world in applications including high-speed pick-and-place machines, accurate assembly machines, vision inspection machines, dispensing stations and high-accuracy scribing stations, for example. Typically, two parallel Y-direction tracks, and at least one Y-direction stage provide Y-direction motion to a bridge that supports an X-direction track which provides X-direction motion to a tool or other device. Thus, the X and Y position of the tool can be established over a workpiece. The Y-direction tracks are fixed relative to a unitary base, for example, a large block of granite or other material. As the ambient temperature of the gantry system changes, there can be a differential thermal expansion or contraction between the base and the bridge which can result in forces between the bridge and the Y-direction stage which, in turn, can place elements of the gantry system out of alignment or cause a change in running friction resulting in a degradation in system performance. The ambient temperature change can result due to changing work environment conditions at the time of shipping, or even as a result of heating of the bridge during use due to the motors it supports.

Compliant mounts or flexures for absorbing stresses due to thermal expansion have been used in the past as shown, for example, in U.S. Pat. No. 6,019,514 and U.S. Pat. No. 6,058,618. For high-precision gantry systems, the assignee of this application has incorporated flexure plates with spaced flexure sections joined to central and outer sections. The outer sections are fixed to either a Y-direction stage or the bridge and the central section is connected to the other of the Y-direction stage and the bridge.

The longer the bridge of a gantry system, the more important it is to provide additional support to prevent rotation or twisting about the longitudinal axis of the bridge. It is an object of this invention to provide such additional support against rotation and twisting without interfering with the functioning of the flexure plates.

SUMMARY OF THE INVENTION

Briefly, according to one embodiment of this invention, there is provided a Cartesian gantry system for mounting on a rigid base comprising spaced and parallel linear Y-translation stages and a bridge for supporting a linear X-translation stage. The gantry system is characterized by an expansion joint between the bridge and a Y-translation stage at only one end of the bridge comprising a flexure plate having upper and lower surfaces parallel to the X- and Y-directions. At least portions of the upper and lower surfaces of the flexure plate abut the bridge and a Y-translation stage. The flexure plate has sections aligned in the X-direction, a central section, two outer sections spaced from the central section in the Y-direction, and two flexure sections joining the central and outer sections, respectively. The flexure sections enable small relative X-direction movement between the central and outer sections by elastic deformation of the flexure sections.

To provide the bridge additional resistance to rotation or twisting about the axis of the bridge (the X-axis) and additional stiffness in the Y-direction, there are provided support flanges connected to and extending perpendicular to the bridge at each end of the bridge having parallel edge surfaces parallel to the X-direction. Bolster flanges connected to and extending from the Y-translation stages at each end of the bridge have edge surfaces parallel to the X-direction and parallel to and adjacent to the edge surfaces of the support flanges associated with the bridge.

Preferably, the edge surfaces of the support flanges associated with the bridge have hard surface flats, preferably, carbide flats adhered thereto and the bolster flanges have recesses in the edge surfaces for holding bearings abutting the carbide flats.

Preferably, the adjacent edge surfaces of the support flanges and bolster flanges are perpendicular to the Y-direction.

Most preferably, the bolster flanges have threaded bores extending entirely through the bolster flanges in the Y-direction and ball-ended thrust screws turned into the recesses (bores) with the ball ends abutting the carbide flats.

Preferably, a surface of the central section of the flexure plate abuts only one of the bridge and a Y-translation stage. Surfaces of the outer sections abut only the other of the bridge or the Y-translation stage. Also, there is provided a clearance between the flexure sections of the flexure plate and the adjacent surfaces of the bridge and Y-translation stage.

Most preferably, the flexure section of the flexure plate comprises a plurality of struts parallel to the Y-direction between the central section and the outer sections. The struts have narrowed sections near the central and outer sections of the flexure plate enabling elastic bending about an axis perpendicular to the X- and Y-directions.

BRIEF DESCRIPTION OF THE DRAWINGS

Further features and other objects and advantages will become clear from the following detailed description made with reference to the drawings in which.

DESCRIPTION OF THE PREFERRED EMBODIMENTS

Figure 1:
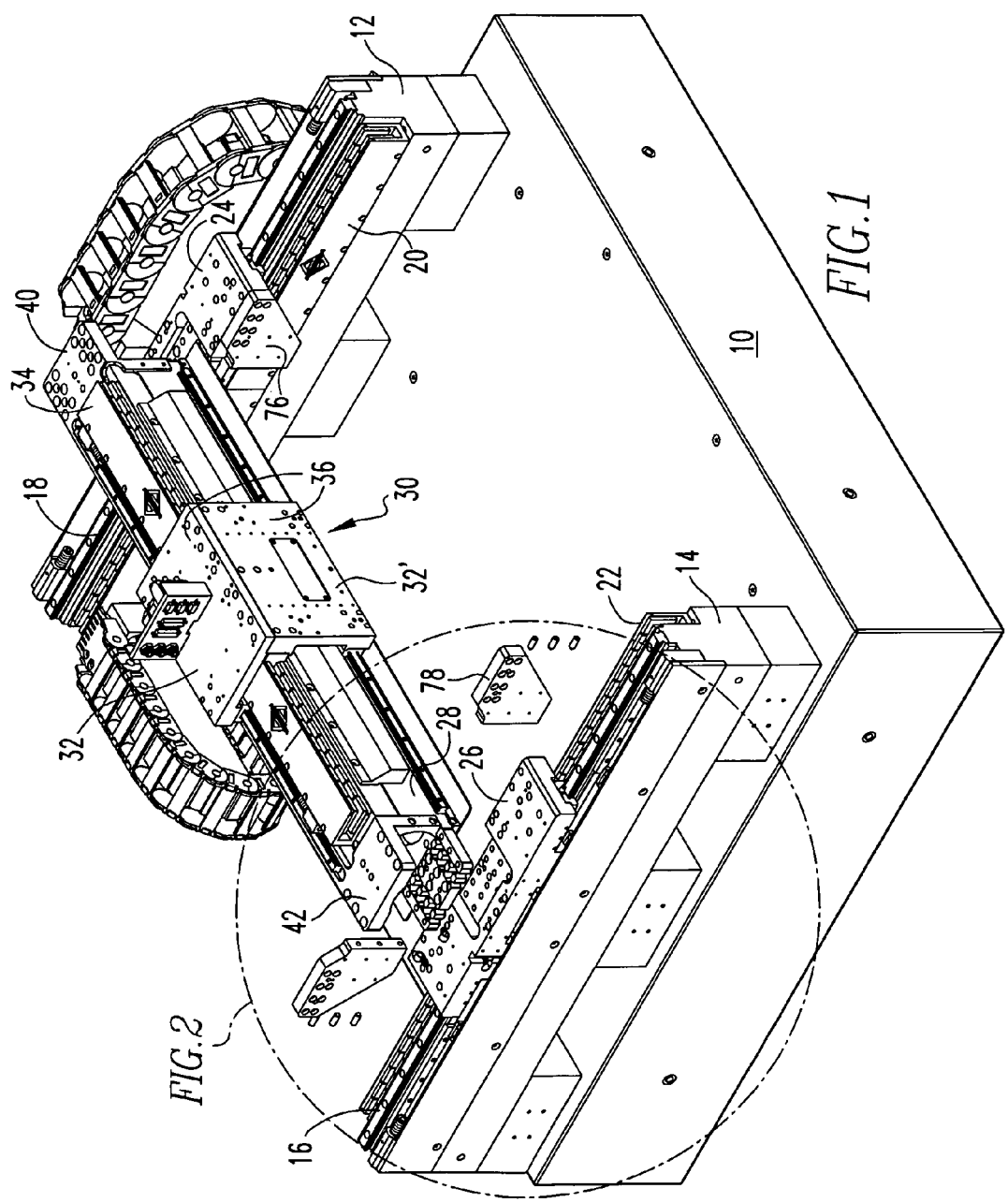
FIG. 1 is a perspective view of a gantry system according to one embodiment of this invention with the bridge exploded away to enable view of the expansion joint.
Figure 3:
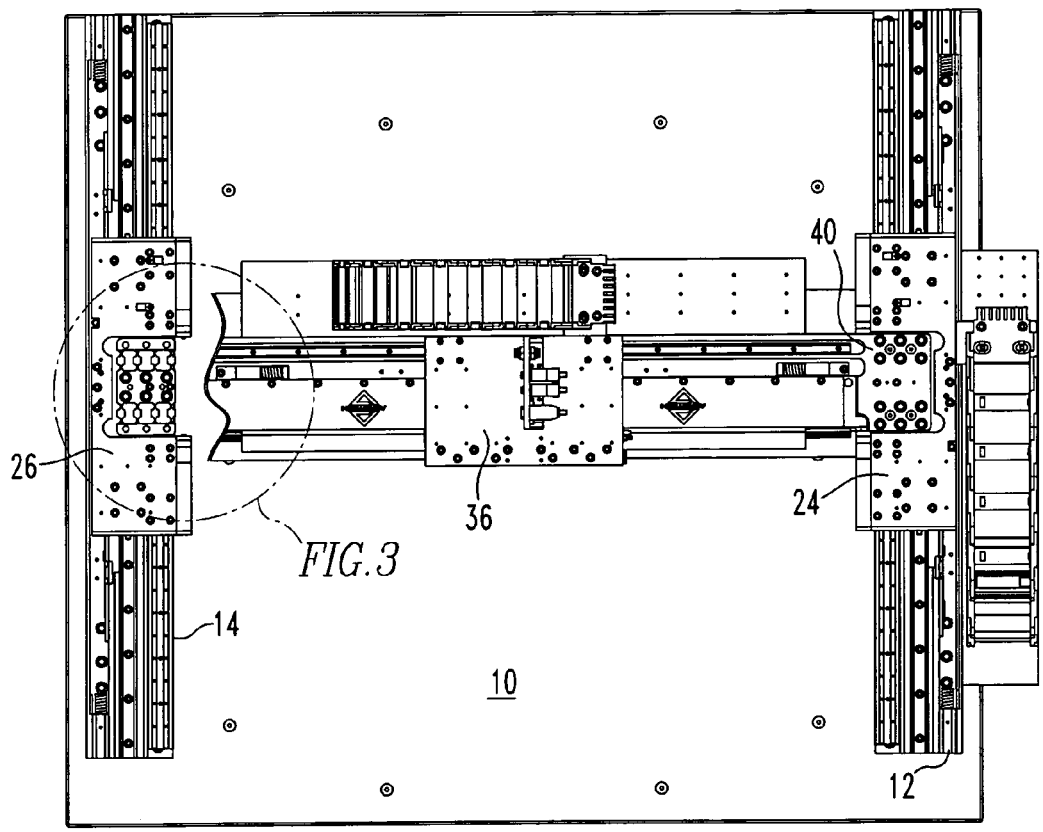
FIG. 3 is a top view of the gantry system of FIG. 1 broken away to show the expansion joint.
Figure 5:
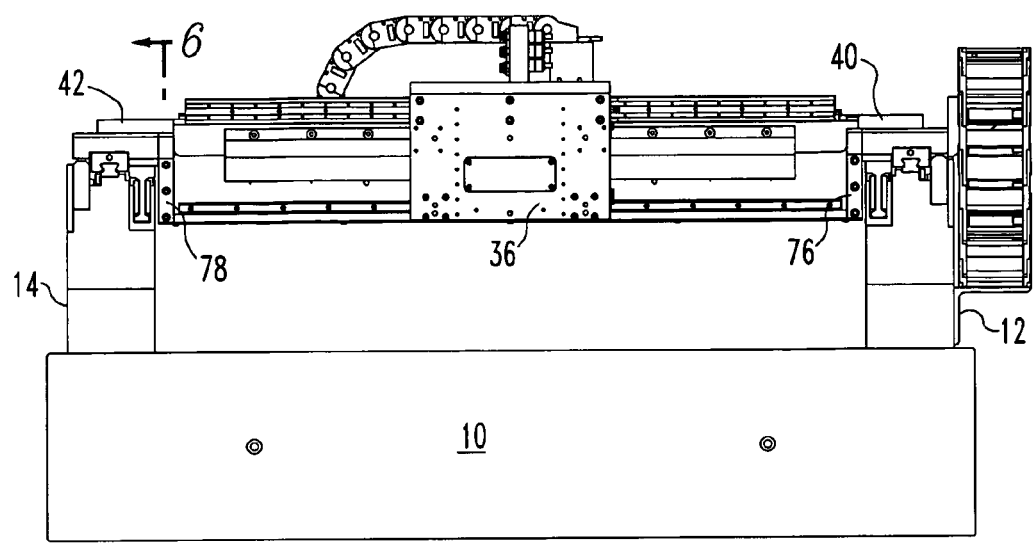
FIG. 5 is a plane view looking along the Y-direction.

Referring now to FIGS. 1, 3 and 5, a Cartesian gantry system is illustrated upon a base 10. Spaced and parallel linear Y-translation stages 12, 14 comprise linear bearings 16, 18 with associated linear motors 20, 22 and encoders (not shown). The linear bearings define the Y-direction and constrain the motion of the Y-carriages 24, 26 riding on the linear bearings. The bearings can be either mechanical or hydrostatic (air, oil, etc.). In this embodiment, mechanical bearings are used, but the concept can easily be extended to air bearings. Air bearings are more susceptible because thermal expansion can cause them to crash.

A bridge 28 for supports a linear X-translation stage 30 comprising a linear bearing X-axis has two bearing rails, one on top 32 and one on the side 32' with an associated linear motor 34. The linear bearing defines the X-direction which is perpendicular to the linear bearings 16, 18 associated with the Y-translation stages and constrains the motion of an X-carriage 36 riding on the linear bearing. The bridge 28 is secured at each end to a Y-carriage 24, 26 by bridge extension plates 40, 42 extending over Y-carriages. Bridge extension plate 40 is fixed to Y-carriage 24. Bridge extension plate 42 is connected to Y-carriage 26 through an expansion joint now to be described.

Figure 2:
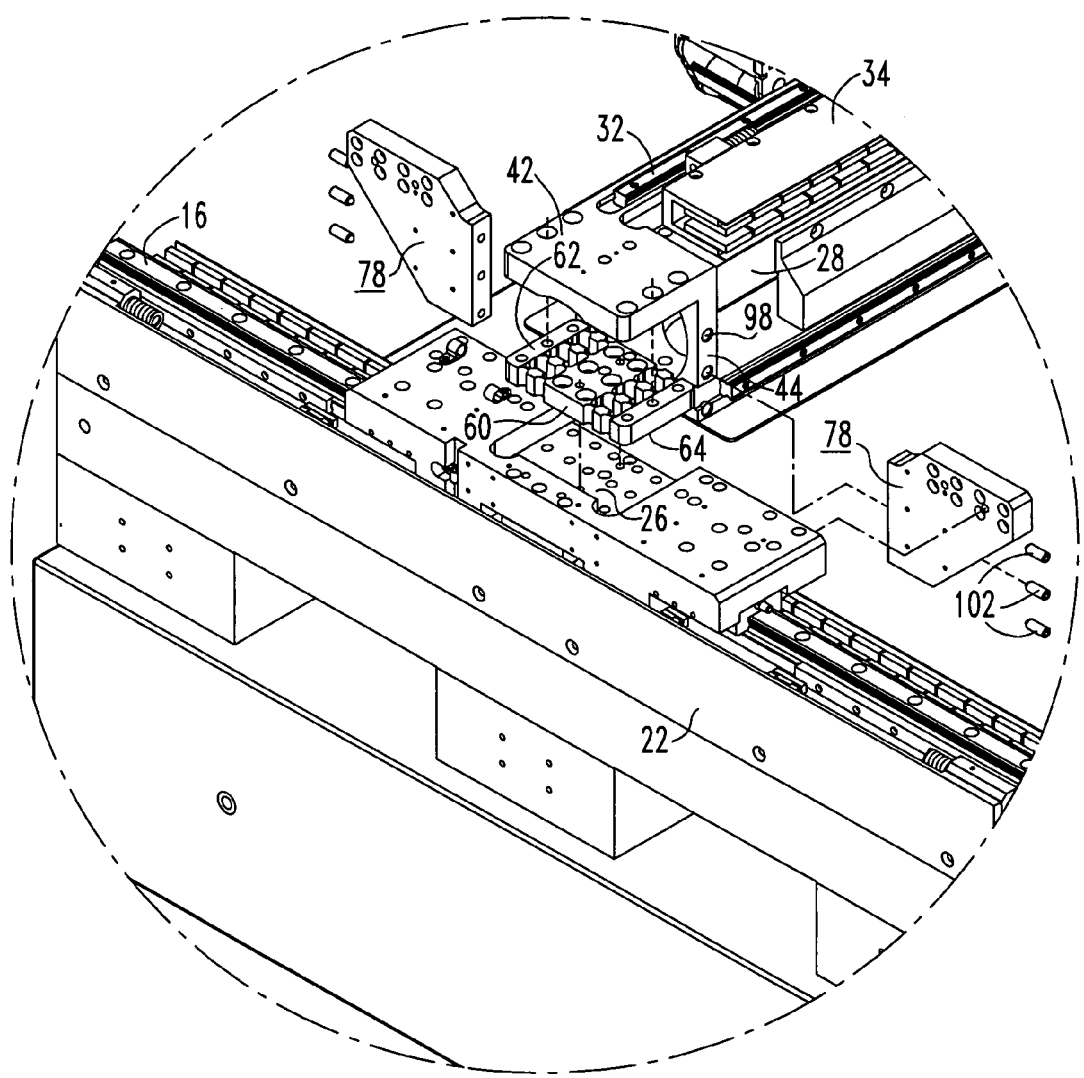
FIG. 2 is an enlarged view of a portion of FIG. 1.
Figure 4:
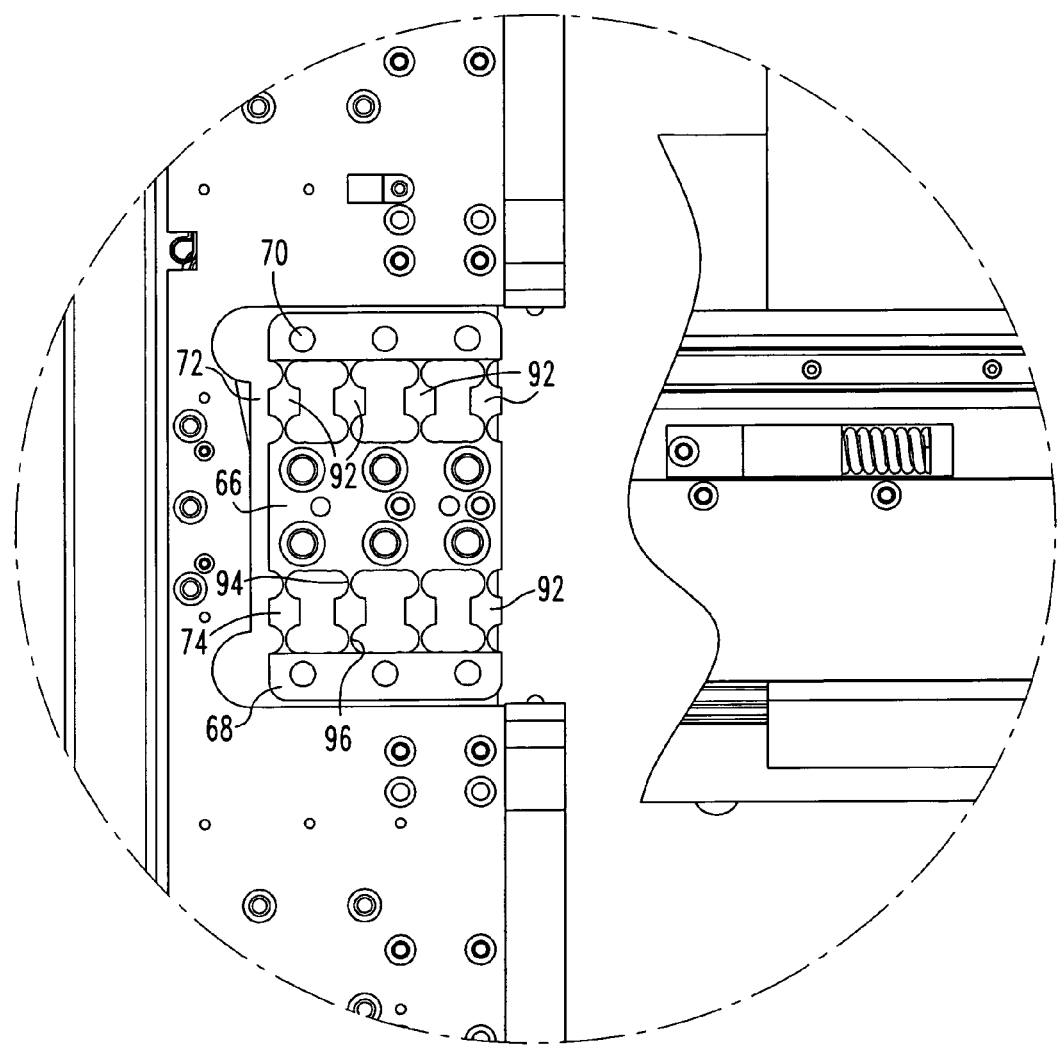
FIG. 4 is an enlarged view of a portion of FIG. 3.
Figure 6:
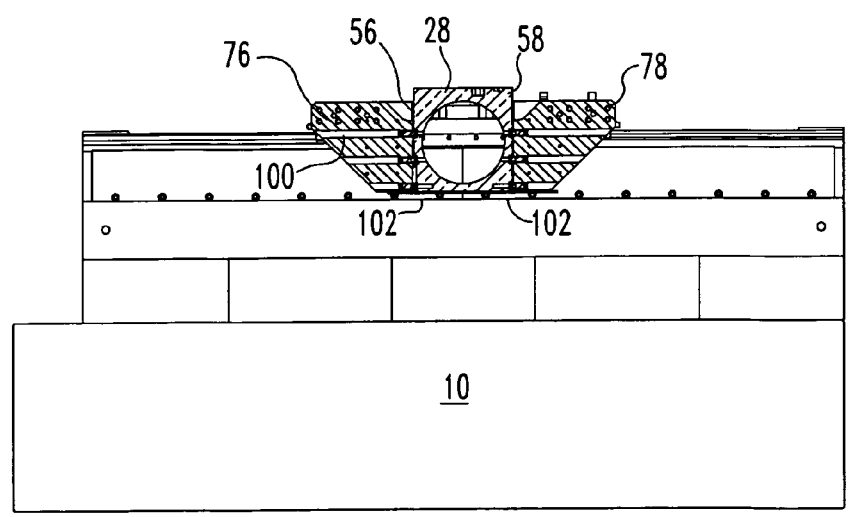
FIG. 6 is a section view taken along line 6-6 of FIG. 5.

Referring now to FIGS. 2 and 4, the expansion joint comprises a bridge extension plate 42 integral with the bridge 28. The bridge extension plate has a lower surface parallel to the X- and Y-directions which extends over the Y-carriage 26. Support flanges 44 connect to the bridge extension plates 40, 42 and extend perpendicular to the bridge extension plates at each end of the bridge and on each side of the bridge (four in all for the illustrated embodiment). The support flanges have parallel edge surfaces 56 and 58 parallel to the X-direction (see FIG. 6).

A flexure plate 60 has upper and lower surfaces 62, 64 parallel to the X- and Y-directions. At least portions of the upper and lower surfaces of the flexure plate 60 abut the bridge extension plate 42 and Y-carriage 26.

Flexure plate 60 has sections aligned in the X-direction, a central section 66, two outer sections 68, 70 spaced from the central section in the Y-direction, and two flexure sections 72, 74 joining the central and outer sections, respectively, enabling slight relative X-direction movement of the central and outer sections by elastic deformation of the flexure sections.

Fasteners secure the central section 66 of the flexure plate to one of the bridge extension plate or the Y-carriage. Fasteners secure the outer sections 68, 70 of the flexure plate to the other of the bridge plate or the Y-carriage. In the illustrated embodiment, the central section is secured to the Y-carriage and the outer sections to the bridge extension plate.

The surface of the central section of the flexure plate abuts only one of the bridge plate or the Y-carriage. A surface of the outer sections abut only the other of the bridge extension plate or the Y-carriage. In the illustrated embodiment, these sections abut only the structure to which they are fastened. A clearance is provided between the flexure sections 72, 74 of the flexure plate 60 and the adjacent surfaces of the bridge extension plate 42 and the Y-carriage 26.

The flexure sections comprise a plurality of struts 92 parallel to the Y-direction between the central section and the outer sections of the flexure plate. The struts have narrowed sections 94, 96 near the central and outer sections of the flexure plate enabling elastic bending about an axis perpendicular to the X- and Y-directions.

Bolster flanges 76, 78 are connected to and extend from the Y-carriages at each end of the bridge. The bolster flanges have edge surfaces parallel to the X-direction and parallel and adjacent to the edge surfaces 56 and 58 of the support flanges associated with the bridge. On the flexure side, the edge surfaces of the support flanges associated with the bridge have carbide flats 98 adhered thereto and the bolster flanges have recesses 100 in the edge surfaces for holding bearings 102 abutting the carbide flats. On the fixed side, the bolster flange 76 is hard mounted to the Y-carriage 24 and bridge 28.

The recesses 100 in the bolster flanges are comprised of threaded bores extending entirely through the bolster flanges in the Y-direction and the bearings comprise ball-ended thrust screws turned into the holes with the ball ends abutting the carbide flats 98. The threaded holes allow for adjustment and load adjustability of the ball-ended screws against the carbide flats.

Having thus described my invention with the detail and particularity required by the Patent Laws, what is desired protected by Letters Patent is set forth in the following claims.

The invention claimed is:

1. A Cartesian gantry system for mounting on a rigid base comprising:
   a) spaced and parallel linear Y-translation stages comprising linear bearings with associated linear motors, the linear bearings defining the Y-direction and constraining the motion of Y-carriages riding on the linear bearings,
   b) a bridge for supporting a linear X-translation stage comprising a linear bearing with an associated linear motor, the linear bearing defining the X-direction, being perpendicular to the linear bearings associated with Y-translation stages and constraining the motion of an X-carriage riding on the linear bearing, said bridge secured at each end to a Y-translation carriage by a bridge extension plate extending over a Y-carriage,
   c) an expansion joint between the bridge and a Y-carriage at only one end of the bridge comprising:
      i) a bridge extension plate integral with the bridge having a lower surface parallel to the X- and Y-directions and extending over the Y-carriage and support flanges connected to and extending perpendicular to the bridge extension plates at each end of the bridge having parallel edge surfaces parallel to the X-direction,
      ii) a flexure plate having upper and lower surfaces parallel to the X- and Y-directions, at least portions of the upper and lower surfaces of said flexure plate abutting the bridge extension plate and the Y-carriage, said flexure plate having sections aligned in the X-direction, a central section, two outer sections spaced from the central section in the Y-direction, and two flexure sections joining the central and outer sections, respectively, enabling small relative X-direction movement of the central and outer sections by elastic deformation of the flexure sections,
      iii) fasteners securing the central section of the flexure plate to one of the bridge plate or the Y-carriage and fasteners securing the outer sections of the flexure plate to the other of the bridge plate or the Y-carriage, and
      iv) bolster flanges connected to and extending from the Y-carriages at each end of the bridge having edge surfaces parallel to the X-direction and parallel and adjacent to the edge surfaces of the support flanges associated with the bridge.

2. The Cartesian gantry system according to claim 1, wherein edge surfaces of the support flanges associated with the bridge have hard surface flats adhered thereto and the bolster flanges have recesses in the edge surfaces for holding bearings abutting the carbide flats.

3. The Cartesian gantry system according to claim 2, wherein the adjacent edge surfaces of the support flanges and bolster flanges are perpendicular to the Y-direction.

4. The Cartesian gantry system according to claim 3, wherein the recesses in the bolster flanges are comprised of threaded bores extending entirely through the bolster flanges in the Y-direction and ball-ended thrust screws turned into the bores with their ball ends abutting the carbide flats.

5. The Cartesian gantry system according to claim 1, wherein a surface of the central section of the flexure plate abuts only one of the bridge extension plate or the Y-carriage, and a surface of the outer sections abuts only the other of the bridge extension plate or the Y-carriage.

6. The Cartesian gantry system according to claim 5, wherein there is provided a clearance between the flexure sections of the flexure plate and the adjacent surfaces of the bridge extension plate and Y-carriage.

7. The Cartesian gantry system according to claim 6, wherein the flexure sections comprise a plurality of struts parallel to the Y-direction between the central section and the outer sections of the flexure plate.

8. The Cartesian gantry system according to claim 7, wherein the struts have narrowed sections near the central and outer sections of the flexure plate enabling elastic bending about an axis perpendicular to the X- and Y-directions.

* * * * *